United States Patent
Patukale et al.

(10) Patent No.: US 10,333,878 B2
(45) Date of Patent: *Jun. 25, 2019

(54) AUTO CLEAN-UP OF UNUSED EMAIL RULES

(71) Applicant: International Business Machines Corporation, Armonk, NY (US)

(72) Inventors: Maitreyee M. Patukale, Pune (IN); Prasad P. Purandare, Pune (IN); Paryushan P. Sarsamkar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 505 days.

This patent is subject to a terminal disclaimer.

(21) Appl. No.: 15/065,936

(22) Filed: Mar. 10, 2016

(65) Prior Publication Data

US 2016/0277344 A1    Sep. 22, 2016

Related U.S. Application Data

(63) Continuation of application No. 14/658,348, filed on Mar. 16, 2015.

(51) Int. Cl.
| | |
|---|---|
| G06F 16/00 | (2019.01) |
| H04L 12/58 | (2006.01) |
| G06F 16/11 | (2019.01) |
| G06F 16/9535 | (2019.01) |
| G06F 16/958 | (2019.01) |
| G06Q 10/10 | (2012.01) |

(52) U.S. Cl.
CPC ............ *H04L 51/12* (2013.01); *G06F 16/113* (2019.01); *G06F 16/958* (2019.01); *G06F 16/9535* (2019.01); *G06Q 10/107* (2013.01); *H04L 51/14* (2013.01); *H04L 51/22* (2013.01)

(58) Field of Classification Search
CPC ............ G06F 11/3684; G06F 11/3692; G06F 17/2705; G06F 17/271; G06F 17/28
See application file for complete search history.

(56) References Cited

U.S. PATENT DOCUMENTS

| | | | |
|---|---|---|---|
| 8,799,786 B2 | 8/2014 | Ahiakpor et al. | |
| 2002/0194045 A1* | 12/2002 | Shay ...................... | G06Q 10/06 705/7.14 |
| 2008/0109448 A1* | 5/2008 | Aboel-Nil ............ | G06Q 10/107 |

(Continued)

OTHER PUBLICATIONS

Holloway, Ward, "Improve Firewall Performance & Security by Removing Unused Rules", Posted on Feb. 13, 2012, <http://www.firemon.com/blog/firewall-management/remove-unused-firewall-rules>.

(Continued)

*Primary Examiner* — Dinku W Gebresenbet
(74) *Attorney, Agent, or Firm* — Alexander G. Jochym

(57) ABSTRACT

Usage-based management of email rules is provided. An unused email rule of a set of active rules is identified. In response to detecting that the unused email rule is removed from the set of active rules, whether the unused email rule matches an incoming message is determined. Whether a count associated with the unused email rule exceeds a predetermined threshold is determined in response to determining that the unused email rule matches the incoming message. The unused email rule is restored to the set of active rules in response to determining that the count exceeds the predetermined threshold.

7 Claims, 4 Drawing Sheets

(56) References Cited

U.S. PATENT DOCUMENTS

| | | | |
|---|---|---|---|
| 2011/0022674 A1 | 1/2011 | Callanan et al. | |
| 2011/0087747 A1* | 4/2011 | Hirst | G06Q 10/107 |
| | | | 709/206 |
| 2014/0052791 A1* | 2/2014 | Chakra | H04L 51/12 |
| | | | 709/206 |
| 2015/0381533 A1* | 12/2015 | Klemm | H04L 51/02 |
| | | | 709/206 |

OTHER PUBLICATIONS

Schmid, Patrick, "How to get around Outlook/Exchange's Rules and Alerts 32KB limit?", provided by inventor on Aug. 11, 2013, <http://serverfault.com/questions/43986/how-to-get-around-outlook-exchanges-rules-and-alerts-32kb-limit>.

"Clean Up Service for Network Connections", An IP.com Prior Art Database Technical Disclosure, IP.com No. IPCOM000229317D, IP.com Electronic Publication: Jul. 22, 2013.

"IceWarp Server 10.4.0", provided by inventor on Aug. 11, 2013, pp. 1-3, <http://www.google.co.in/url?sa=t&rct=j&q=&esrc=s&source=web&cd=1&ved=0CBsQFjAA&url=http%3A%2F%2Fwww.icewarp.com%2Fdownload%2FAdmin_Notes_10.4.pdf&el=eGTrU-DxD5Pt8AXUvoHYBA&usg=AFQjCNGJnAIBCWeBKtr2q2HnAoMLmJopHQ&sig2=ktqh99m85PqXeInoyKeTZg&bvm=bv.72938740,d.dGc&cad=rja)>.

"Is there a limit to the number of mail rules each user can create?" Reference #: 1091326, Modified date: Sep. 13, 2004, <http://www-01.ibm.com/support/docview.wss?uid=swg21091326>.

"Some rules are disabled, and you receive an error message when you try to create or enable rules in Outlook", Article ID: 886616—Last Review: Jan. 26, 2013—Revision: 7.0, <http://support.microsoft.com/kb/886616>.

Patukale et al., "Auto Clean-Up of Unused Email Rules", U.S. Appl. No. 14/658,348, filed Mar. 16, 2015, 38 pages.

Appendix P—List of IBM Patents or Patent Applications Treated as Related, 2 Pages.

* cited by examiner

AUTO CLEAN-UP OF UNUSED EMAIL RULES

TECHNICAL FIELD

The present invention relates generally to the field of email and, more particularly, to usage-based management of email rules.

BACKGROUND OF THE INVENTION

Generally, users create email rules to manage the user's mailbox and email messages. Every rule includes one or more conditions and one or more actions to perform in response to the conditions being met. Such actions include, for example, deleting a message or moving a message between folders. Rules may be used to manage incoming email messages as they are received or on email messages already received. A rule matches a message if the message meets the conditions of the rule. If a rule matches a message, the rule is executed on the message.

SUMMARY

According to one embodiment of the present invention, a method for usage-based management of email rules is provided. The method includes: identifying, by one or more processors, an unused email rule of a set of active rules; in response to detecting, by one or more processors, that the unused email rule is removed from the set of active rules, determining whether the unused email rule matches an incoming message; determining, by one or more processors, whether a count associated with the unused email rule exceeds a predetermined threshold in response to determining that the unused email rule matches the incoming message; and restoring, by one or more processors, the unused email rule to the set of active rules in response to determining that the count exceeds the predetermined threshold.

According to another embodiment of the present invention, a computer program product for usage-based management of email rules is provided. The computer program product comprises a computer readable storage medium having program instructions embodied therewith, wherein the computer readable storage medium is not a transitory signal per se. The program instructions are readable by a processor to cause the processor to perform a method. The method comprises: identifying an unused email rule of a set of active rules; in response to detecting, by one or more processors, that the unused email rule is removed from the set of active rules, determining whether the unused email rule matches an incoming message; determining, by one or more processors, whether a count associated with the unused email rule exceeds a predetermined threshold in response to determining that the unused email rule matches the incoming message; and restoring, by one or more processors, the unused email rule to the set of active rules in response to determining that the count exceeds the predetermined threshold According to another embodiment of the present invention, a computer system for usage-based management of email rules is provided. The computer system includes one or more computer processors, one or more computer readable storage media, and program instructions stored on the computer-readable storage media for execution by at least one of the one or more processors. The program instructions cause the at least one processor to perform a method comprising: identifying an unused email rule of a set of active rules; in response to detecting that the unused email rule is removed from the set of active rules, determining whether the unused email rule matches an incoming message; determining whether a count associated with the unused email rule exceeds a predetermined threshold in response to determining that the unused email rule matches the incoming message; and restoring the unused email rule to the set of active rules in response to determining that the count exceeds the predetermined threshold.

DETAILED DESCRIPTION

Embodiments of the present invention recognize that, with time, users add more email rules to manage the user's email messages (often shortened to "messages"). However, a rule may become obsolete over time. For example, a new rule may supersede or otherwise conflict with one or more other rules. In another example, a value specified by a rule may have become invalid, such as an email address that has been deactivated. Embodiments of the present invention recognize a need to review the rules from time to time in order to remove obsolete rules. However, it is tedious for a user to identify a particular rule that needs modification because of the interactions between rules and the large number of rules that may exist. Thus, the user must spend considerable time analyzing each rule, even if the rule has remained unused for a long period of time.

Embodiments of the present invention further recognize that applying a large number of email rules to multiple messages is computationally expensive. Rules may be of varying degrees of importance to the user. Applying rules which are obsolete adds needless computational overhead. Also, there may be a limit to a number of email rules which can be retained. Such a limit may be established in the interest of managing the computational cost of applying the rules or the storage space required to store the rules. Once the limit is reached, a new rule cannot be added without removing an existing rule. Thus, embodiments of the present invention recognize a need to optimize the number of email rules in a mail application.

Embodiments of the present invention further recognize that a user may manually purge an obsolete rule only to need the rule at a later time. In this case, the user must manually recreate the rule, which is also tedious and time consuming.

Figure 1:
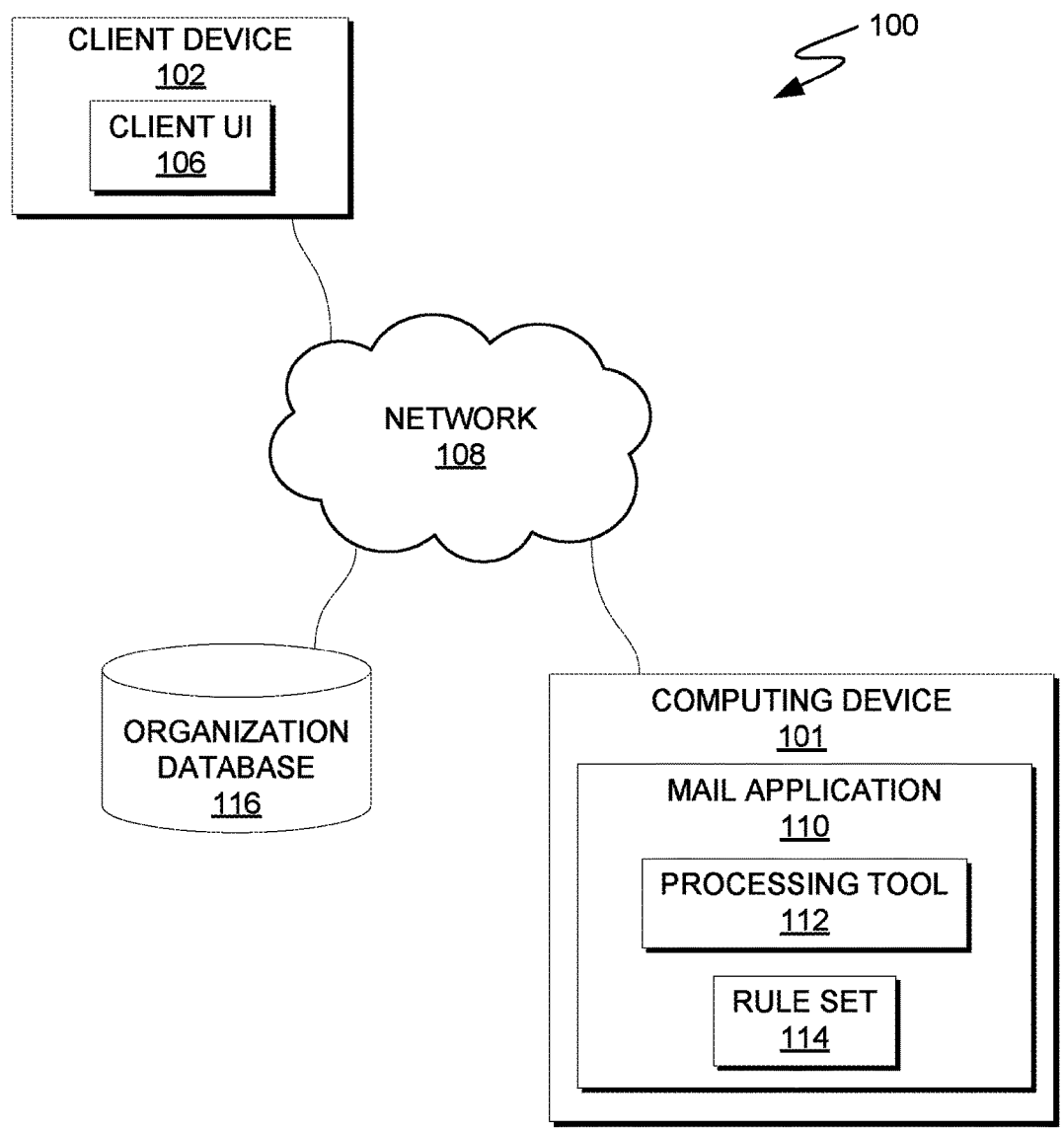
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes computing device 101, client device 102, and organization database 116 connected over network 108. Computing device 101 includes mail application 110.

Network 108 can be, for example, a local area network (LAN), a wide area network (WAN) such as the Internet, or a combination of the two, and may include wired, wireless, fiber optic or any other connection known in the art. In general, network 108 can be any combination of connections and protocols that will support communications between computing device 101, client device 102, and organization database 116, in accordance with a desired embodiment of the present invention.

In various embodiments, computing device 101 is a computing device that can be a standalone device, a server, a laptop computer, a tablet computer, a netbook computer, a personal computer (PC), or a desktop computer. In another embodiment, computing device 101 represents a computing system utilizing clustered computers and components to act as a single pool of seamless resources. In general, computing device 101 can be any computing device or a combination of devices with access to client device 102 and organization database 116, and with access to and/or capable of executing mail application 110, processing tool 112, and rule set 114. Computing device 101 may include internal and external hardware components, as depicted and described in further detail with respect to FIG. 4. In one example, computing device 101 may represent several computer systems (called email servers and gateways) linked together over a communication network (e.g., the Internet), allowing exchange of messages across the world.

In this exemplary embodiment, mail application 110, processing tool 112, and rule set 114 are stored on computing device 101. In other embodiments, one or more of mail application 110, processing tool 112, and rule set 114 may reside on another computing device, provided that each can access and is accessible by each other, and provided that each can access client device 102 and organization database 116. In yet other embodiments, one or both of mail application 110, processing tool 112, and rule set 114 may be stored externally and accessed through a communication network, such as network 108.

In some embodiments, computing device 101 further includes a storage area, a set of email rules (e.g., rule set 114) and a list of users. The storage area may also store incoming and outgoing messages. For example, the storage area may include a mailbox (not shown) that stores messages. In some embodiments, the list of users may be a database of user accounts managed by mail application 110. In one example, the database of user accounts may be maintained by mail application 110. In another example, the database may be at least partially maintained by client device 102.

In various embodiments, client device 102 can be a laptop computer, a tablet computer, a netbook computer, a personal computer (PC), a desktop computer, a personal digital assistant (PDA), a smart phone, or any programmable electronic device capable of communicating with computing device 101 via network 108.

Client device 102 includes a user interface (UI), client UI 106, which executes locally on client device 102 and operates to provide a UI to a user of client device 102. Client UI 106 further operates to receive user input from a user via the provided user interface, thereby enabling the user to interact with client device 102. In one embodiment, client UI 106 provides a UI that enables a user of client device 102 to interact with mail application 110 of computing device 101 via network 108. In various examples, the user interacts with mail application 110 in order to configure email rules, view messages hosted by computing device 101, or download messages from computing device 101. In one embodiment, client UI 106 is stored on client device 102. In other embodiments, client UI 106 is stored on another computing device (e.g., computing device 101), provided that a user can access client UI 106 and that client UI 106 can access and is accessible by at least mail application 110.

In some embodiments, client device 102 may also include an email client application that is used to read, write and send messages. Through client UI 106, the email client application receives text input and allows for creation and sending of an email. An email client application may have at least one associated email account that is handled by mail application 110. An account identifies an identity or address that is used in sending and receiving email messages and sets forth various options, data (e.g., address book information), and the like, which may be involved in the sending and receiving of messages to and from client device 102.

Mail application 110 operates to perform usage-based management of email rules. In one embodiment, existing email rules are analyzed to determine whether the existing email rules are active or inactive. Existing email rules are email rules of rule set 114 that are currently in force. For example, existing email rules may be processed for each incoming messages. If a rule matches messages with a frequency above a threshold, then the rule is an active rule. Otherwise, the rule is an inactive rule. Further, an inactive may be a rule that is unused, unexecuted, or unattended for a predetermined time period. In response to determining that a rule is inactive, mail application 110 archives the inactive rule. Archived rules are not applied to incoming messages, which may help reduce computational costs. In some embodiments, mail application 110 may restore an archived rule. For example, mail application 110 provides a suggestion to a user to restore an archived rule in response to determining that the archived rule matches incoming messages with a predetermined frequency.

In some embodiments, mail application 110 archives an inactive rule by moving the inactive rule from rule set 114 to a archived rule repository (not shown). For example, the archived rule repository may be a portion of storage within rule set 114 or may be a portion of storage separate from rule set 114. In another embodiment, the archived rule repository may reside in organization database 116. In other embodiments, mail application 110 archives an inactive rule by modifying rule set 114 to identify the inactive rule as archived. For example, mail application 110 adds metadata to rule set 114 in association with the inactive rule, wherein the metadata identifies the inactive rule as archived.

In one embodiment, whether a rule is active or inactive is based, at least in part, on a usage pattern corresponding to the email rules. In one example, the usage pattern may include a computed frequency at which the rule matches incoming messages. In another example, the usage pattern may include a determined validity of the email rules. In this embodiment, if it is determined, based on the usage pattern, that a rule has remained unused or is not required in the current business scenario, then mail application 110 archives the rule.

In the depicted embodiment, mail application 110 includes processing tool 112 and rule set 114. In some embodiments, one or both of processing tool 112 and rule set 114 are modules of mail application 110. In other embodiments, one or both of processing tool 112 and rule set 114 are independent of, but communicably connected with, mail application 110.

In one embodiment, mail application 110 identifies an email rule of rule set 114 to take an action on each incoming message received from a sender (e.g., a user of client device 102). Based on identifying the email rule which matches the properties of the incoming message, mail application 110 executes the identified email rule on the incoming message by performing one or more actions identified by the email rule.

Rule set 114 is a data repository that may be written to and read by one or both of mail application 110 and processing tool 112. Email rules may be stored to rule set 114. As explained previously, an email rule includes at least a condition and an action. The email rule may also include an exception. There can be multiple conditions and actions in one email rule. In some embodiments, rule set 114 may also store zero or more archived rules. In some embodiments, rule set 114 further includes, for each email rule, a contact identifier, a rule identifier, one or more conditions, and one or more actions.

In some embodiments, rule set 114 may be written to and read by programs and entities outside of computing environment 100 in order to populate the repository with email rules. In one example, a user of client device 102 creates or modifies an email rule via client UI 106. In this example, the email rule is stored to rule set 114. In another embodiment, mail application 110 generates an email rule that is stored to rule set 114. In one embodiment, rule set 114 stores data corresponding to an individual user or individual email account. In this case, computing device 101 may store an instance of rule set 114 for one or more users or email accounts.

Organization database 116 is a data repository that may be written to and read by one or more of mail application 110, processing tool 112, and client device 102. Organization data may be stored to organization database 116. In some embodiments, organization database 116 may be written to and read by programs and entities outside of computing environment 100 in order to populate the repository with organization data.

Organization database 116 may include data of an organization such as a project management system (PMS) and an organization's address book (OAB) and, in some embodiments, archived rule repository (not shown as separate components). The OAB may include a list of contacts of the organization. The PMS may include a list of projects of the organization. The archived rule repository may include archived inactive email rules.

In various examples, organization database 116 may reside in computing device 101, client device 102, or another computing device (not shown). Generally, organization database 116 represents a data repository that is accessible by computing device 101 and that may also be accessible by client device 102. In the depicted embodiment, organization database 116 is shown as a single unit that stores information of the organization. In another embodiment, organization database 116 represents multiple database units communicatively coupled with one another, which may be located at different locations. For example, organization database 116 may be synchronized with other storage (e.g., off-site storage) that maintains a backup of the data of organization database 116. In one example, such a backup may be updated in real time, periodically, at specified intervals, or otherwise.

In one example, computing device 101 (via mail application 110) hosts one or more messages via a web-accessible interface. In this case, a user of client device 102 may access the messages via client UI 106 (e.g., a web browser).

In another example, computing device 101 is a destination email server to which one or more messages have been sent. In this case, mail application 110 receives and stores the messages in electronic mailboxes corresponding to the recipient of each message. A recipient can download a message via client device 102 and open the message for reading. The messages can then be saved in an electronic file, printed, deleted, or kept in a mailbox on client device 102. Each of the one or more messages received by mail application 110 may be stored, archived, or discarded from computing device 101. In another example, mail application 110 may work as a distinct application in integration with an email server that complies with any of various email protocols.

Processing tool 112 operates to monitor and review email rules of rule set 414. In one embodiment, processing tool 112 operates concurrently with mail application 110. In one embodiment, processing tool 112 operates to analyze and modify an email rule.

In one embodiment, in response to receiving an incoming email, mail application 110 may communicate with processing tool 112 to deliver the incoming message. In another embodiment, mail application 110 may instantiate an instance of processing tool 112 to deliver the incoming message based an email rule matching the incoming message. In another embodiment, mail application 110 may instantiate an instance of processing tool 112 in response to mail application 110 not finding a matching email rule of email rules 114.

Processing tool 112 can access organization database 116. In one embodiment, processing tool 112 may be configured to monitor and analyze archived rules stored in the archived rules repository (of, for example, organization database 116 or rule set 114) for editing and updating. Processing tool 112 may be configured to receive notification of the changes done to the organization database 116.

In one implementation, processing tool 112 may be invoked on demand, periodically, at specified intervals, or otherwise. At times, processing tool 112 may be invoked at the request received from client device 102.

Once instantiated, processing tool 112 analyzes an incoming message received by mail application 110 by monitoring the email rules of email rules 114 and any archived rules. Processing tool 112 may be configured to determine whether an email rule matching the incoming message is archived or active. Processing tool 112 may be configured to perform an action identified by an active rule. In response to processing tool 112 determining that the incoming email matches an active rule, processing tool 112 may perform one or more actions identified by the active rule. In response to processing tool 112 determining that the incoming mail matches an archived rule, processing tool 112 may trigger a flag accordingly in the archived rules repository.

Processing tool 112 may be configured to compute a usage pattern of each of the email rules, including the archived rules. Processing tool 112 may compute a frequency or last usage of an email rule based on a log file (of, for example, mail application 110). In one embodiment, processing tool 112 may analyze the log file to compute a usage pattern of each of the existing email rules. Processing tool 112 may further determine a validity of an email rule based, at least in part, on organization data of organization database 116.

In one embodiment, processing tool 112 may be configured to compute the usage pattern based on performance of each of the email rules at fixed time intervals. In another example, processing tool 112 may be configured to compute the usage pattern based on time elapsed since the last usage of the email rules. In yet another embodiment, processing tool 112 may be configured to consider a preference associated with the email rules, while computing the usage pattern. In yet another embodiment, processing tool 112, to compute the usage pattern, may additionally analyze the validity of the email rules based on gathering information from the organization database 116 (e.g., OAB and PMS data). From the computed usage pattern, processing tool 112 may be configured to detect an inactive rule of email rules 114.

In one example, based on the information received from the organization database 116, processing tool 112 may be configured to validate each of the email rules based on a policy of use. The policy of use identifies email rules that will get applied to incoming messages in the future.

Processing tool 112 may be configured to monitor the organization's database 116 to fetch details which can be related to the existing email rules. For example, corresponding to a contact's identifier as maintained in the organization database 116, processing tool 112 may associate the respective contact's identifier with a corresponding match in the email rules. If the contact's match is found in the OAB data in the organization database 116, processing tool 112 may indicate the email rule as valid rule. Similarly, wherein processing tool 112 determines that there is no match in the OAB data of organization database 116, the corresponding email rule may be indicated as invalid rule. Invalid rules are archived in a manner similar to inactive rules.

Similarly, processing tool 112 may be configured to access the project details in PMS, and correspondingly associate to the email rules. From PMS, processing tool 112 may identify a corresponding project's information as maintained. Wherein processing tool 112 is able to find a match in the PMS, the associated email rule may be indicated as valid rule, and wherein there is no match, the associated email rule may be indicated as invalid rule. Processing tool 112 may generate a validity report.

Further, processing tool 112 may be configured to compute a ranking for each of the email rules (including active and archived rules). Processing tool 112 may be configured to monitor the respective databases concurrently, sequentially, or in any other order. Processing tool 112 may compute a ranking based on at least one of a frequency of use, an assigned preference, and the validity of the email rules.

Processing tool 112 detects an inactive (e.g., unused) email rule based, at least in part, on the computed usage pattern. In one embodiment, in response to processing tool 112 determining from the usage pattern that an email rule matches an incoming message and is valid as per policy of use, the email rule is indicated as an active rule and is retained in rule set 114. In response to processing tool 112 determining that the email rule is not valid, processing tool 112 may further determine whether the email rule should be archived or modified. Processing tool 112 may determine whether the corresponding email rule will match messages in the future if modified. For example, processing tool 112 determines that the email rule will become valid based on a modification, in which case the email rule is indicated as active. Alternatively, processing tool 112 may determine that the email rule is invalid or unused and, in response, processing tool 112 may archive the email rule. For example, a condition of an email rule specifies a contact that left the organization or a project that is suspended, canceled, or finished, in which case processing tool 112 identifies the email rule as invalid. In this case, if processing tool 112 fails to identify a modification to make the email rule valid, then processing tool 112 identifies the email rule as inactive.

Processing tool 112 archives email rules identified as inactive. In one embodiment, the inactive email rules may be removed automatically by processing tool 112. In another embodiment, processing tool 112 may provide the detected inactive email rule for display at client UI 106 for an archive decision. In various examples, in response to receiving an archive decision, processing tool 112 may archive the email rule, identify the rule as active, or modify the rule with updated conditions, actions, or exceptions.

In one implementation, organization database 116 may be configured to send a notification to processing tool 112 to alert processing tool 112 of a change in the data to organization database 116. Processing tool 112 may be configured to perform a validity check on the email rules associated with a change in the data and may automatically apply the corresponding changes to the associated email rule to keep the email rule valid.

In one implementation, processing tool 112 may continue to monitor incoming emails, to identify the email rules being executed in the incoming email. Wherein processing tool 112 identifies that an archived rule matches an incoming email, processing tool 112 may be configured to trigger a flag of the archived rule. Processing tool 112 may further increment a count to the matching email rule in the archived rules repository.

In one implementation, processing tool 112 may compute a threshold for each of the archived rules. Processing tool 112 may further determine whether the matching email rule meets a threshold. Once established that the threshold is met, processing tool 112 may restore the archived rule back to active status. In various examples, processing tool 112 may restore the archived rule by removing the archived rule from the archived rule repository, updating metadata associated with the rule in rule set 114, or otherwise reverse the process of archiving the email rule. Processing tool 112 may compute and update a ranking corresponding to the restored email rule.

In one embodiment, in response to determining that a ranking of an archived email rule is higher than a ranking of an active email rule, processing tool 112 may restore the archived rule having the higher ranking and archive the active rule having the lower ranking. Processing tool 112 may continue to monitor and update the ranking of each of the email rules, as and when the email rules are either removed or restored, automatically.

In one implementation, processing tool 112 may updated the email rules of rule set 114 based on changes to a remotely stored backup of the email rules.

Figure 2:
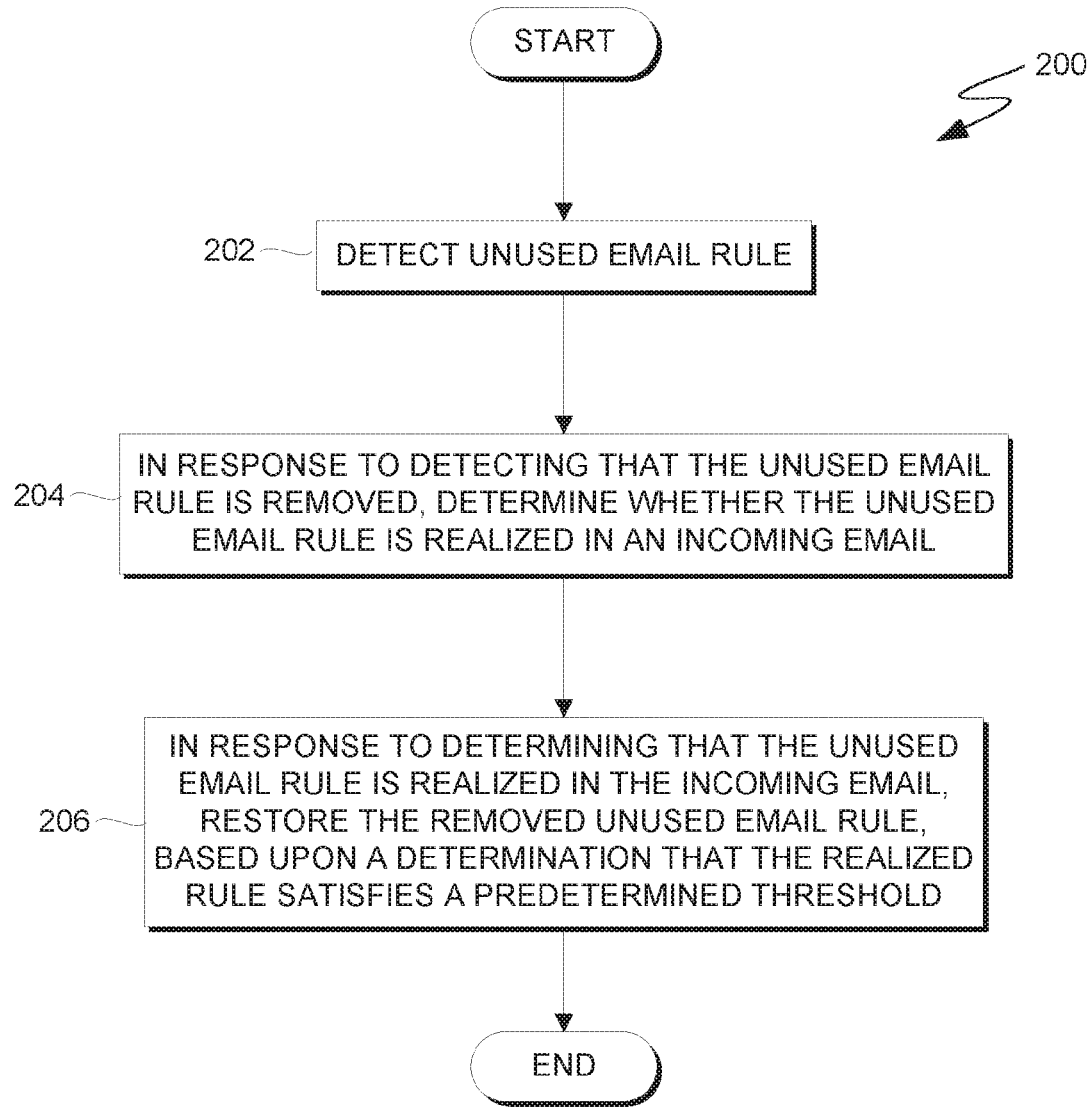
FIG. 2 is a flowchart depicting operations for usage-based management of email rules, on a computing device within the computing environment of FIG. 1, in accordance with an embodiment of the present invention.

FIG. 2 is a flowchart depicting operations for usage-based management of email rules, on a computing device within the computing environment of FIG. 1, in accordance with an embodiment of the present invention. For example, FIG. 2 is a flowchart depicting operations 200 of mail application 110 on computing device 101 within computing environment 100.

In step 202, an unused email rule is detected. An email rule is detected as unused based on monitoring a pattern of email rules matching incoming messages. An email rules is used when it matches an incoming message.

Properties of an incoming message are evaluated against the conditions of each active rule to determine if the properties meet the conditions. If a rule matches an incoming message, the rule is executed by performing any actions identified by the rule.

Each time a rule is executed, a log is updated in a log file. The log file may be maintained from the time a rule is created. The log file may store additional information along with metadata including one or more of a rule's identifier, a rule's creation date, rule criteria, any modifications, any preference, and performance (execution) details. The log file may be stored on a server (e.g., computing device 101). The log file may be a relational database. The log file may be accessed through each user's account. The email rule may be identified by the email rule's identifier and optionally by a user's account. From the log file, a track of the execution of the email rule is determined. In one example, the log file may include a computed usage pattern of the existing email rules. Furthermore, the log file is updated each time the email rule is executed in an incoming email.

To detect an unused email rule, apart from monitoring the incoming emails, a usage pattern may be computed. The usage pattern may be computed based on at least one of: a ranking that may be computed; and/or validity of execution of the email rules based on policy of use. The ranking may be further calculated based on at least one or more parameters such a frequency of use, a preference (if any), time elapsed since last usage.

A trigger for computation of the usage pattern may be generated each time the email is delivered. At times, irrespective of the trigger, the usage pattern may be computed at regular intervals automatically. In one example, such a computation may happen in response to an interaction received from a user. The usage pattern may be computed in the background.

In one embodiment, the frequency of the existing email rules is decided from execution details taken from the log maintained in the log file. The frequency is measured as a given email rule's performance at fixed timestamp intervals such as one month, three months, and so on. The performance may determine a manner in which the email rules performed in the past. From analyzing the past performance of the existing email rules at fixed intervals, the email rules that executed regularly as against the email rules which have not executed in that time interval may get identified. Additionally, from the log, a time elapsed since last usage of the email rule may be determined.

In one implementation, a ranking may be assigned to each of the email rules based on the computed frequency and/or the last usage. In some embodiments, the ranking may be a variable, computed on assigning different priorities to the one or more parameters. In some implementations, before a ranking is assigned, validity of the existing email rules may be established. In one embodiment, validity of each of the email rules may be considered for computing the usage pattern.

Validity of the email rules may be established with support from external data. An example of external data may be an OAB and/or project management system (PMS) and so forth. The OAB is a database that contains information on each of the contacts of an organization. From OAB, it can be verified which of the contacts are still continuing with the organization or left. Also information such as, the contacts whose email address got changed/updated or which contact went for a long leave and so on can be known. Similarly, the project management system (PMS) may be a database containing details on list of projects. An update on which policies are being followed on existing projects (severity of the projects) is noted. Further information such as, current status of each of the project's is known.

The external data may help determine whether a rule will get applied on the incoming email message or not. In other words, it can be deduced which of the existing rules may be processed or required in the future. For establishing validity of the email rule, the email rule is associated with the corresponding external data (OAB and/or PMS), and if there is a match found in the associated data, the rule is taken as pass and certified as valid, else the rule is taken as not pass and certified as invalid.

By associating data as in OAB with corresponding email rules, it is identified which existing rules (in the mail application) are executable. For example, if the contact left the organization, the corresponding rule will not be executed/implemented, the email rule will be certified as invalid, and if the contact continues to be part of the organization, the associated rule is taken as valid.

Similarly from PMS, a knowledge of which project got shelved or canceled or finished is deduced. Further, based on associating a project with the existing email rules, it can be decided which of the existing email rules should be taken as valid or invalid. For example, if it becomes known that a project got canceled, the associated email rule (that relates to the project) is certified as invalid and using this information, it can be decided whether such email rule should be retained in the mail application.

A validity report may be generated that includes a validity status of each of the email rules.

In one implementation, data corresponding to OAB, PMS may be integrated in a real time such that any changes that occurs in the data, may generate an automatic trigger for an associated email rule. For example, wherein the email rule contains a contact identifier who left the organization, such an associated email rule can be automatically invalidated.

In one implementation, while computing ranking each of the parameters may be given separate priorities based on varying degree of importance. As such, ranking of each of the rules may vary based on a logic used. The logic may be predetermined as a configuration setting. In some embodiments, such logic may be defined on an ongoing basis. The logic may be a model developed that is adaptive for computing ranking automatically using any mathematical function. The mathematical function may be add, subtract, multiply, divide, average or a linear combination of the computed parameters.

For example, if the policy is to assign higher priority to project A than project B, while computing ranking project A may get weightage over project B. Similarly, if a project is flagged with severity, it may get a high weightage than a project that got shelved. There may be other organizational considerations as well, for example, each of the email rules which are certified as valid, a higher ranking may get assigned and wherein it is determined that the email rule is invalid, a low ranking may be assigned.

From the computed ranking, a report may be generated. The report may be in the form of a static or dynamic file or log that can be read and monitored. In one example, a matrix may be generated for identifying unused or unexecuted or unattended email rules from active email rules in the mail application. The matrix may include information, such as when the email rule executed last, and/or whether the email rule is valid as per policy, and/or assigned ranking. From the report, the usage pattern is determined, identifying active and unattended, or unexecuted or unused email rules.

From the usage pattern, the email rules that are performing and non-performing are detected and marked. The email rules that are executing and valid are distinguished and identified as performing, and indicated as active email rules with high preference. The email rules that have not executed recently but are valid are distinctively identified as low performing active rules, with low preference. Further, the email rules which are invalid are separately identified as non-performing and marked as inactive email rules.

Based on the performance, the email rules may be arranged in the mail application. The email rules that are performing get preference over the email rules which have not performed, for being retained in the mail application. In one embodiment, the email rules that are indicated as active, get top priority to remain in the mail application, unless there is a limit to the number of email rules that can be retained in the mail application. In such a situation, high preference email rules are retained in the mail application and the low preference email rules may be removed from the mail application.

Further, before removing the identified inactive email rules from the mail application, it is further determined, whether the inactive email rules will become valid on modification. Wherein the email rules can be valid on modification, such identified email rules may be retained in the mail application, as active rules. However, wherein the email rules will not be certified as valid even on modification, such email rules are indicated as unused email rules. The unused (inactive) email rules are the rules which cannot be implemented in the future and have remained unexecuted. For example, the email rule is indicated as invalid because the project is finished or canceled, the email rule will not get executed/implemented in near future, and such email rule may be indicated as an unused email rule.

In some implementations, wherein the email rules can be made valid on modification are modified automatically. For example, by verifying from the address book OAB, if it is established that the contact's identifier has changed, the associated email rule is updated by replacing with the existing identifier as in OAB.

In some implementations, wherein it is determined that the email rule cannot be automatically modified, before removing the detected unused email rule, the email rule may be displayed at the user interface for modification. If the user performs the modification, the identified email rule may be retained as an active email rule in the mail application or else removed as unused (inactive/unexecuted) email rule.

In one embodiment, the detected unused email rule may be automatically removed from the mail application. In some implementations, the user interface provide an option to verify whether the detected unused email rule may be deleted. In this case, the user interface also displays a suggestion of whether the detected unused rule is likely to be restored in the future, based on the computed usage pattern of the detected unused email rule.

In one embodiment, wherein the detected unused email rules are removed/deleted from the mail application, such detected unused email rules are no longer available to the mail application for processing. The removed unused email rules are automatically stored in a removed email rules repository. The database of the unused email rules repository may include the removed email rule's identifier, conditions, actions, and such other details including computed usage pattern.

In one implementation, the mail application may store a path to the removed email rules repository. In one example, the removed email rules repository may be in a local system. In another example, the removed email rules repository may be located on a cloud. In yet another implementation, the removed email rules repository of the local system may be in sync with cloud's removed rules repository for appropriate back up. In one example, a path to the removed email rules repository on the local system may be provided to a user for modifications.

At step 204, in response to the detected unused email rule is removed, an incoming email is monitored to determine whether the removed unused email rule is realized.

The email rules are applied to the incoming email to identify a corresponding email rule that matches to the properties contained in the incoming email. When a match between the properties of the incoming email and the email rules in the mail application, is not found, the incoming email gets delivered at the mailbox without any corresponding action.

In one embodiment, the properties of the incoming email are automatically monitored and matched with the removed unused email rules stored in the removed email rules repository. Wherein it is determined that the properties in the incoming email match to the removed unused email rule, a flag may be triggered correspondingly in the removed email rules repository to indicate that the removed unused email rule has been realized in the incoming email. A count may be incremented to the identified unused email rule which got realized.

At step 206, in response to the removed unused email rule is realized in the incoming email, restoring the removed unused email rule, based upon a determination that the realized email rule satisfies a predefined threshold.

Having determined that the removed unused email rule is realized in the incoming mail, the method determines if the realized email rule may be restored back to the mail application. Before the realized email rule is restored back, it may be further determined whether the realized email rule satisfies a predefined threshold. Once the predefined threshold is satisfied, the removed unused email rule may be restored back to the mail application.

In one embodiment, corresponding to each of the removed unused email rules a threshold may be computed, which may vary for each email rule. The threshold may be predefined by the user or may be auto generated. In one embodiment, based upon ranking and/or validity and/or policy, the threshold may be generated.

Each time the removed unused email rule is realized in the incoming email, a count is incremented corresponding to the removed unused email rule in the removed mail rules repository. It is verified if the count is matched to the predefined threshold. When the count equals the predefined threshold, the email rule may be restored back automatically to the mail application. Alternatively, the user may be prompted to exercise a discretion, whether the realized unused email rule may be restored back to the mail application. For example, at the user's display a notification may be provided that the realized email rule is being executed in the incoming emails, the email rule can be restored and made available in the mail application for action.

In one implementation, wherein a user creates a new email rule corresponding to the incoming email, and before the email rule is saved as the new email rule in the mail application, the email rule may be checked with the removed unused email rules in the removed email rules repository. If there is a match, the user may be informed that the corresponding email rule is available in the removed email rules repository. The detected removed unused email rule may be provided at the user's interface for display. The user may be enabled to activate the detected removed unused email rule from the removed email rules repository to the mail application, instead of creating the new rule.

After the realized email rule is restored back to the mail application, actions corresponding to the conditions laid in the email rule may get processed in the incoming emails. The realized email rule is deleted from the removed email rules repository.

Additionally, in the mail application, the ranking may be correspondingly updated and the usage pattern of the restored email rule is recomputed.

The above embodiments and implementations may combine together and cross-reference, thereby resulting in more embodiments.

Figure 3:
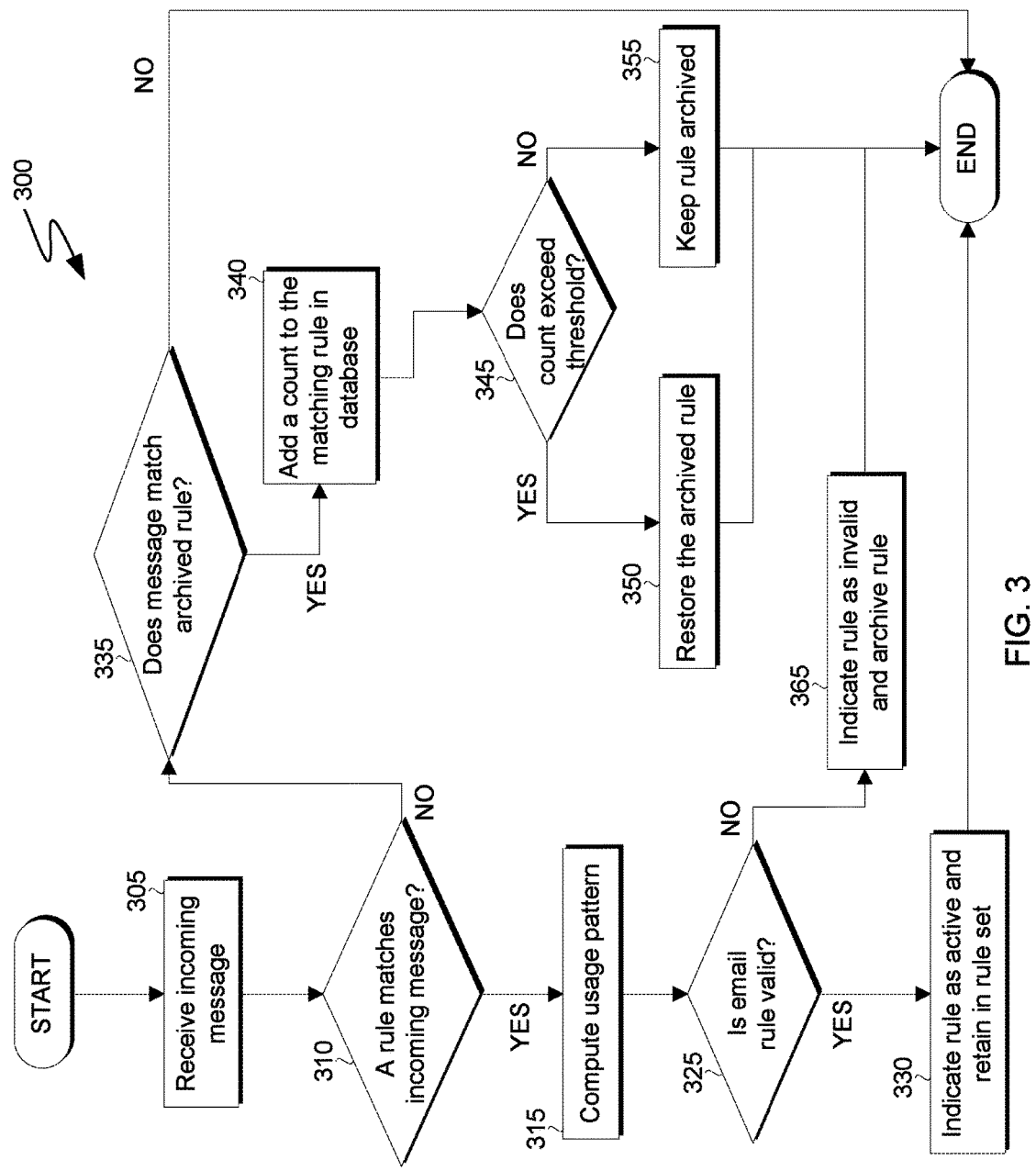
FIG. 3 is a flowchart depicting operations of an example implementation for usage-based management of email rules, on a computing device within the computing environment of FIG. 1, in accordance with an embodiment of the present invention.

FIG. 3 is a flowchart depicting operations for usage-based management of email rules, on a computing device within the computing environment of FIG. 1, in accordance with an embodiment of the present invention. For example, FIG. 3 is a flowchart depicting operations 300 of mail application 110 on computing device 101 within computing environment 100.

In step 305, mail application 110 receives an incoming message. Mail application 110 applies any email rules with conditions that match the properties of the incoming message.

In decision 310, mail application 110 determines whether an email rule has been executed. Mail application 110 determines that an email rule has been executed if the conditions of an email rule match the properties of the incoming message. If mail application 110 determines that an email rule has been executed (decision 310, YES branch), then mail application 110 computes a usage pattern (step 315). If mail application 110 determines that no email rule has been executed (decision 310, NO branch), then mail application 110 determines whether an archived rule matches the incoming message (decision 335). In response to an email rule matching the incoming message, mail application 110 executes the rule by performing the actions of the email rule.

In step 315, mail application 110 computes a usage pattern. The usage pattern corresponds to the matching email rule. The usage pattern may be computed based on at least one of: frequency of execution of the rule, a specified preference, and validity using external data such as organization's contacts and projects assessment.

In decision 325, mail application 110 determines whether the email rule is valid. Mail application 110 determines whether the email rule is valid based, for example, on organization data of organization database 116. If mail application 110 determines that the email rule is valid (decision 325, YES branch), then mail application 110 indicates the rule as active and retains the rule in rule set 114 (step 330). If mail application 110 determines that the email rule is invalid (decision 325, NO branch), then mail application 110 indicates the rule as invalid and archives the rule (step 365). In one embodiment, mail application 110 determines whether the email rule is valid based on the computed usage pattern and the policy of use. If the computed usage pattern satisfies the policy of use, then mail application 110 determines that the rule is valid.

In step 330, mail application 110 indicates the rule as active and retains the rule in rule set 114. In this case, the usage pattern of the identified email rule is validated as per policy.

In decision 335, mail application 110 determines whether the incoming message matches an archived rule. If mail application 110 determines that the incoming message does match an archived rule (decision 335, YES branch), then mail application 110 adds a count to the matching archived rule in the archived rule repository (step 340. If mail application 110 determines that the incoming message does not match an archived rule (decision 335, NO branch), then operations 200 conclude.

In step 340, mail application 110 adds a count to the matching rule in the archive rule repository. Based on a determination that the incoming message contains properties that match the conditions of an archived rule, a count corresponding to the archived rule is incremented. The count indicates how many incoming messages match the archived rule. In some embodiments, the count of an archived rule decrements over time. In other embodiments, each increment to the count is associated with a time of an incoming message and counts beyond a predetermined threshold of time expire.

In decision 345, mail application 110 determines whether the count of an archived rule exceeds a threshold. Before an archived rule is restored, it is determined whether a count of the archived rule exceeds a predefined threshold. If mail application 110 determines that the count exceeds the threshold (decision 345, YES branch), then mail application 110 restores the archived rule (step 350). If mail application 110 determines that the count does not exceed the threshold (decision 345, NO branch), then mail application 110 keeps the rule archived (step 355).

In step 350, mail application 110 restores the archived rule.

In step 355, mail application 110 keeps the rule archived. Thus, the archived rule remains in the archived rule repository.

In step 365, mail application 110 indicates the rule as invalid and archives the rule. In one embodiment, mail application 110 archives rules that are unused, as determined by mail application 110 based on the usage pattern of the rule. In another embodiment, mail application 110 archives rules that are invalid.

In one implementation, databases corresponding to the mail application and/or the removed email rules repository are accordingly updated.

Figure 4:
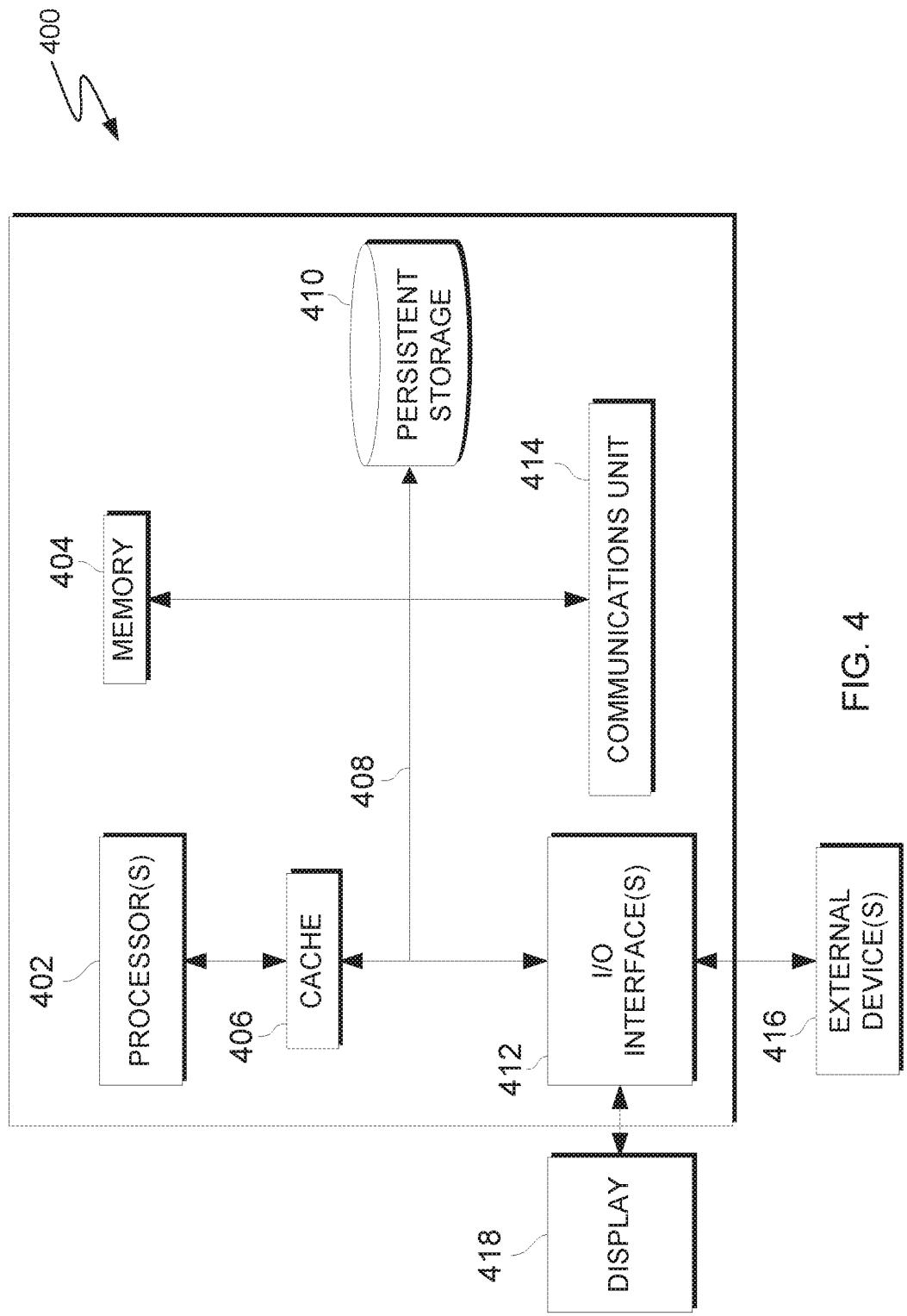
FIG. 4 is a block diagram of components of a computing device executing operations for usage-based management of email rules, in accordance with an embodiment of the present invention.

FIG. 4 is a block diagram of components of a computing device, generally designated 400, in accordance with an embodiment of the present invention. In one embodiment, computing device 400 is representative of computing device 101 within computing environment 100, in which case computing device 101 includes mail application 110, processing tool 112, and rule set 114.

It should be appreciated that FIG. 4 provides only an illustration of one implementation and does not imply any limitations with regard to the environments in which different embodiments may be implemented. Many modifications to the depicted environment may be made.

Computer system 400 includes processor(s) 402, cache 406, memory 404, persistent storage 410, input/output (I/O) interface(s) 412, communications unit 414, and communications fabric 408. Communications fabric 408 provides communications between cache 406, memory 404, persistent storage 410, communications unit 414, and input/output (I/O) interface(s) 412. Communications fabric 408 can be implemented with any architecture designed for passing data and/or control information between processors (such as microprocessors, communications and network processors, etc.), system memory, peripheral devices, and any other hardware components within a system. For example, communications fabric 408 can be implemented with one or more buses or a crossbar switch.

Memory 404 and persistent storage 410 are computer readable storage media. In this embodiment, memory 404 includes random access memory (RAM). In general, memory 404 can include any suitable volatile or non-volatile computer readable storage media. Cache 406 is a fast memory that enhances the performance of processor(s) 402 by holding recently accessed data, and data near recently accessed data, from memory 404.

Program instructions and data used to practice embodiments of the present invention may be stored in persistent storage 410 and in memory 404 for execution by one or more of the respective processor(s) 402 via cache 406. In an embodiment, persistent storage 410 includes a magnetic hard disk drive. Alternatively, or in addition to a magnetic hard disk drive, persistent storage 410 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 410 may also be removable. For example, a removable hard drive may be used for persistent storage 410. Other examples include optical and magnetic disks, thumb drives, and smart cards that are inserted into a drive for transfer onto another computer readable storage medium that is also part of persistent storage 410.

Communications unit 414, in these examples, provides for communications with other data processing systems or devices. In these examples, communications unit 414 includes one or more network interface cards. Communications unit 414 may provide communications through the use of either or both physical and wireless communications links. Program instructions and data used to practice embodiments of the present invention may be downloaded to persistent storage 410 through communications unit 414.

I/O interface(s) 412 allows for input and output of data with other devices that may be connected to each computer system. For example, I/O interface(s) 412 may provide a connection to external device(s) 416 such as a keyboard, keypad, a touch screen, and/or some other suitable input device. External device(s) 416 can also include portable computer readable storage media such as, for example, thumb drives, portable optical or magnetic disks, and memory cards. Software and data used to practice embodiments of the present invention can be stored on such portable computer readable storage media and can be loaded onto persistent storage 410 via I/O interface(s) 412. I/O interface(s) 412 also connect to display 418.

Display 418 provides a mechanism to display or present data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for usage-based management of email rules, the method comprising:
    identifying, by one or more processors, an unused email rule of a set of active rules;
    in response to detecting, by one or more processors, that the unused email rule is removed from the set of active rules, determining whether the unused email rule matches an incoming message;
    determining, by one or more processors, whether a count associated with the unused email rule exceeds a predetermined threshold in response to determining that the unused email rule matches the incoming message; and
    restoring, by one or more processors, the unused email rule to the set of active rules in response to determining that the count exceeds the predetermined threshold.

2. The method of claim 1, wherein identifying the unused email rule further comprises:
    determining, by one or more processors, a usage pattern of a first email rule of the set of active rules; and
    determining, by one or more processors, whether to archive the first email rule based on the usage pattern.

3. The method of claim 2, wherein determining the usage pattern further comprises:
    determining, by one or more processors, a ranking of the email rule; and
    validating, by one or more processors, the email rule based on a policy of use.

4. The method of claim 3, wherein the ranking is based on a time elapsed since the email rule was last executed.

5. The method of claim 1, further comprising:
    removing, by one or more processors, the unused email rule from the set of active email rules in response to identifying the unused email rule as inactive, wherein the set of active email rules are email rules that are applied to incoming messages; and
    archiving, by one or more processors, the unused email rule by storing the unused email rule to an archived rule repository.

6. The method of claim 1, wherein the count of the unused email rule represents a count of incoming messages having properties that match one or more conditions of the unused email rule within a predetermined period of time.

7. The method of claim 3, further comprising:
    updating, by one or more processors, the ranking of the unused email rule after restoring the unused email rule.

* * * * *